US012633470B2

(12) United States Patent
    Kumar et al.

(10) Patent No.: US 12,633,470 B2
(45) Date of Patent: May 19, 2026

(54) SYSTEMS AND METHODS FOR REDUCING CONTACTOR FREEZING

(71) Applicant: Ford Global Technologies, LLC, Dearborn, MI (US)

(72) Inventors: Vivek Kumar, Troy, MI (US); Di Zhu, Novi, MI (US); Sumanth Reddy Dadam, New Hudson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 609 days.

(21) Appl. No.: 17/936,769

(22) Filed: Sep. 29, 2022

(65) Prior Publication Data

US 2024/0113360 A1     Apr. 4, 2024

(51) Int. Cl.
    H01H 1/62        (2006.01)
    H01M 50/50       (2021.01)

(52) U.S. Cl.
    CPC ............. H01H 1/62 (2013.01); H01M 50/50 (2021.01); *H01H 2239/036* (2013.01); *H01M 2220/20* (2013.01)

(58) Field of Classification Search
    CPC .... H01M 50/50; H01H 1/62; H01H 2239/036
    See application file for complete search history.

(56) References Cited

U.S. PATENT DOCUMENTS

| | | | | |
|---|---|---|---|---|
| 5,801,607 | A | * | 9/1998 | Duverger ............. H01H 51/065 |
| | | | | 335/131 |
| 9,105,951 | B2 | | 8/2015 | Anderson-Straley et al. |
| 11,493,001 | B1 | | 11/2022 | Dudar et al. |
| 2002/0164473 | A1 | | 11/2002 | Buckley |
| 2012/0096716 | A1 | | 4/2012 | Tran |
| 2013/0101735 | A1 | | 4/2013 | Tran |
| 2018/0219237 | A1 | | 8/2018 | Shaikh et al. |
| 2019/0067162 | A1 | * | 2/2019 | Ing ...................... H01L 23/4275 |
| 2019/0139716 | A1 | * | 5/2019 | Burkman ............. H01H 50/546 |
| 2021/0041183 | A1 | | 2/2021 | Ishmael et al. |
| 2021/0395588 | A1 | | 12/2021 | Anand et al. |
| 2023/0301036 | A1 | * | 9/2023 | Gregory .................. G06F 1/203 |
| | | | | 361/679.53 |

(Continued)

FOREIGN PATENT DOCUMENTS

| | | |
|---|---|---|
| CN | 113787915 A | 12/2021 |
| DE | 202012101093 U1 | 7/2012 |

(Continued)

OTHER PUBLICATIONS

Kahwaji et al., "A comprehensive study of properties of paraffin phase change materials for solar thermal energy storage and thermal management applications", 2018, Energy, 162, pp. 1169-1182, https://doi.org/10.1016/j.energy.2018.08.068 (Year: 2018).*

(Continued)

*Primary Examiner* — Nicholas A Smith
*Assistant Examiner* — Ziheng Lu
(74) *Attorney, Agent, or Firm* — McCoy Russell LLP

(57)            ABSTRACT

Methods and systems are provided for reducing contactor freezing. In one example, a system may include a contactor comprising a set of conductors and a phase change material. The phase change material is coupled to a first conductor of the set of conductors and is not positioned between the set of conductors.

17 Claims, 5 Drawing Sheets

(56)                  References Cited

U.S. PATENT DOCUMENTS

2024/0321526 A1 *    9/2024    Wahl, III  .............   H01H 50/546

FOREIGN PATENT DOCUMENTS

| | | | |
|---|---|---|---|
| KR | 20090104930 | A | 10/2009 |
| KR | 100991089 | B1 | 10/2010 |
| KR | 20170000302 | U | 1/2017 |
| KR | 20210070553 | A | 6/2021 |
| WO | 2009080162 | A1 | 7/2009 |

OTHER PUBLICATIONS

Grant, "Understanding Paraffins: A Comprehensive Guide with Examples", 2025, FlavoringFood, https://flavoringfood.com/what-are-paraffins-and-give-examples/ (Year: 2025).*
Durakool, "HVDC Contactors and Failure Modes", 2025, https://www.durakool.com/information/technology/hvdc-contactors-failure-modes/ (Year: 2025).*
Kraiem et al., "Thermophysical Characterization of Paraffins versus Temperature for Thermal Energy Storage", 2023, Buildings, 13, https://doi.org/10.3390/buildings13040877 (Year: 2023).*

* cited by examiner

SYSTEMS AND METHODS FOR REDUCING CONTACTOR FREEZING

FIELD

The present description relates generally to methods and systems for an electrical circuit of a battery.

BACKGROUND/SUMMARY

A contactor is an electromechanical switching device used to open or close an electrical circuit. A contactor may include an electromagnetic coil and one or more sets of contacts. The set of contacts may be two contacts adjustable between an open position, where the two contacts are separated by an air gap, and a closed position, where the two contacts are in face sharing contact. When the electromagnetic coil is de-energized, the one or more sets of contacts may be in either the open position or the closed position. When the electromagnetic coil is energized (e.g., activated), a magnetic field is generated which actuates movement of the one or more sets of contacts to the opposite position (e.g., from the open to the closed position or vice versa). When the set of contacts is in the open position, current is prevented from flowing through the contactor and current flows through the contactor when the contacts are in the closed position.

Contactors may be used in a hybrid or all-electric vehicles to modulate a flow of electricity to and from a traction battery of the hybrid or all-electric vehicle. During operation and/or storage of the vehicle, moisture may collect between the contacts of the contactor. If an ambient temperature outside of the vehicle is below freezing and the contacts are open, the moisture may become ice crystals between the contacts in the open position. Water freezing between the contacts may be further accelerated by rapid cooling of a main circuit of the vehicle after vehicle shut-down. Ice crystals between the open contacts may prevent contacts from achieving face sharing contact when the contactor is switched to the closed positon, thus preventing current from flowing through the contactor.

In one example, the issues described above may be addressed by a contactor comprising a set of conductors a set of conductors; and a phase change material coupled to at least a first conductor of the set of conductors, wherein the phase change material is not positioned between the set of conductors. In this way, the cooling of conductor of a contactor after the vehicle is turned off may be slowed and passively maintained at a temperature above freezing without demanding modification to a controller of the vehicle. Moisture may still be present within the contactor, but nucleation of ice crystals between the conductors may be prevented. Ice crystals forming on other parts of the contactor may not interfere with operation of the electrical circuit. Further, the phase change material may be readily coupled (e.g., retrofit) to already existing battery electrical circuits.

As one example, the phase change material may store heat generated at the contactor while the vehicle is in operation and supply that heat to the contacts to keep the contacts above freezing for a duration of time.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
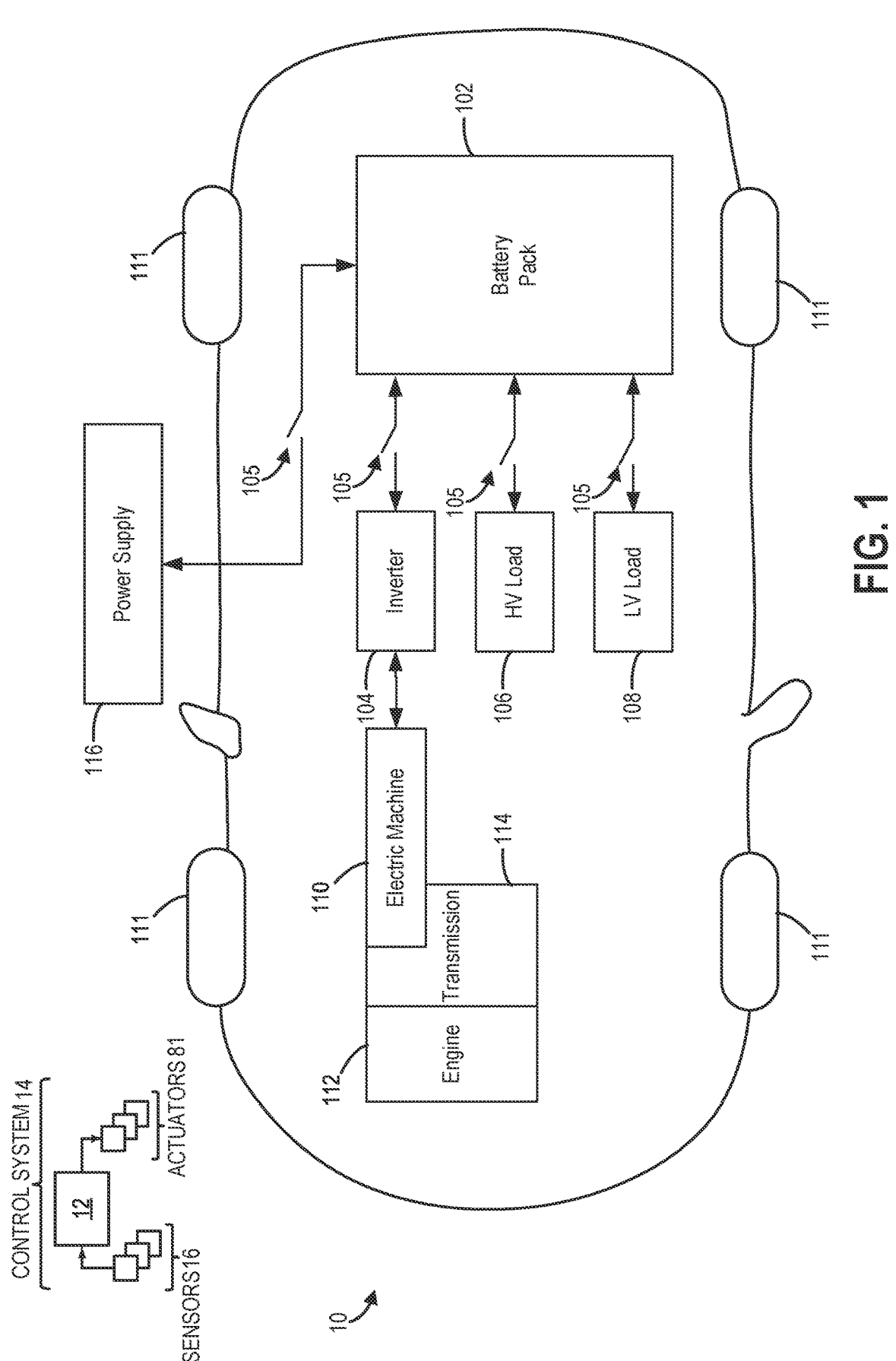
FIG. 1 shows a schematic of a hybrid electric vehicle.
Figure 2:
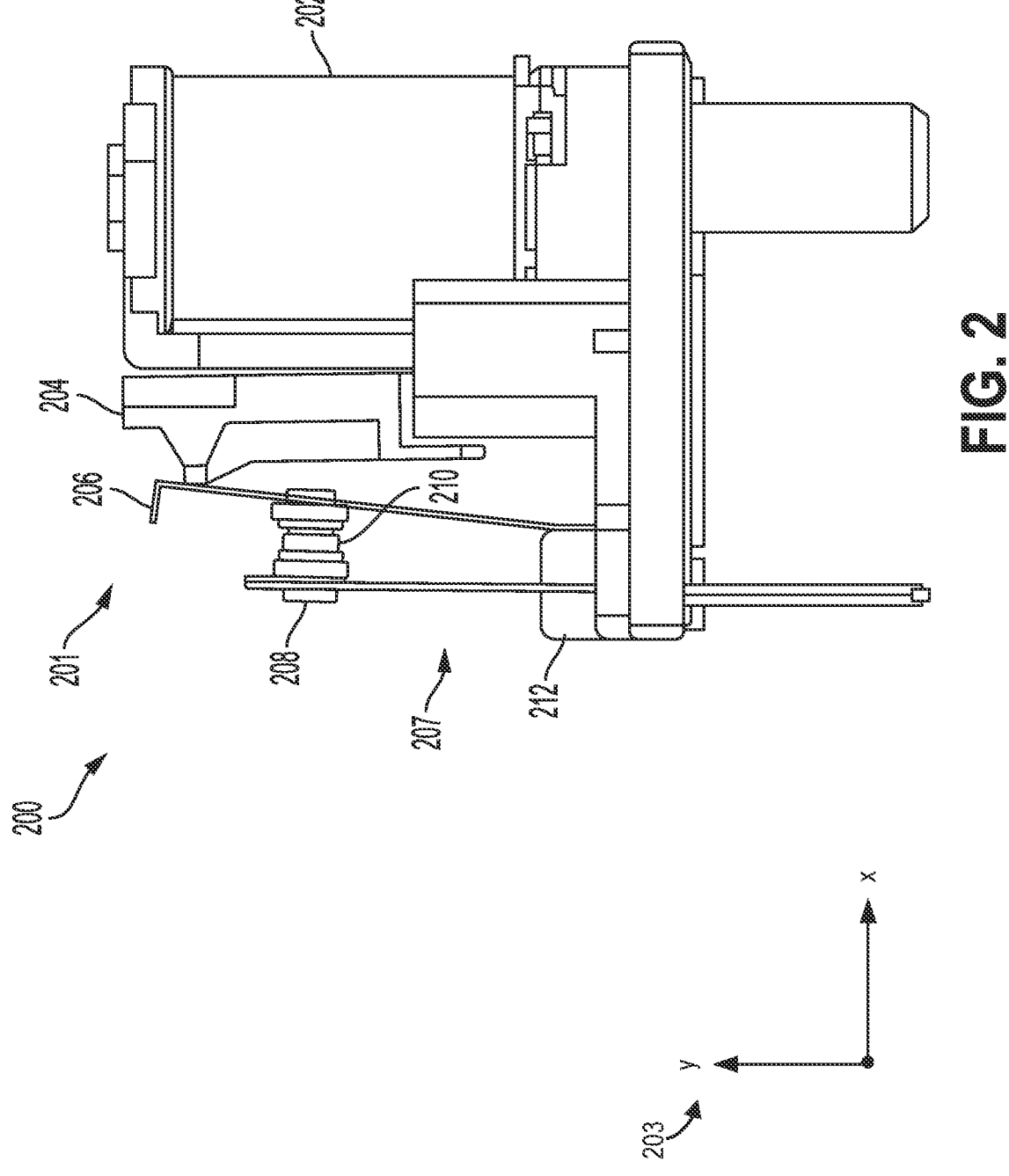
FIG. 2 shows an example of a contactor of the prior art included in an electrical circuit of the vehicle of FIG. 1.
Figure 3:
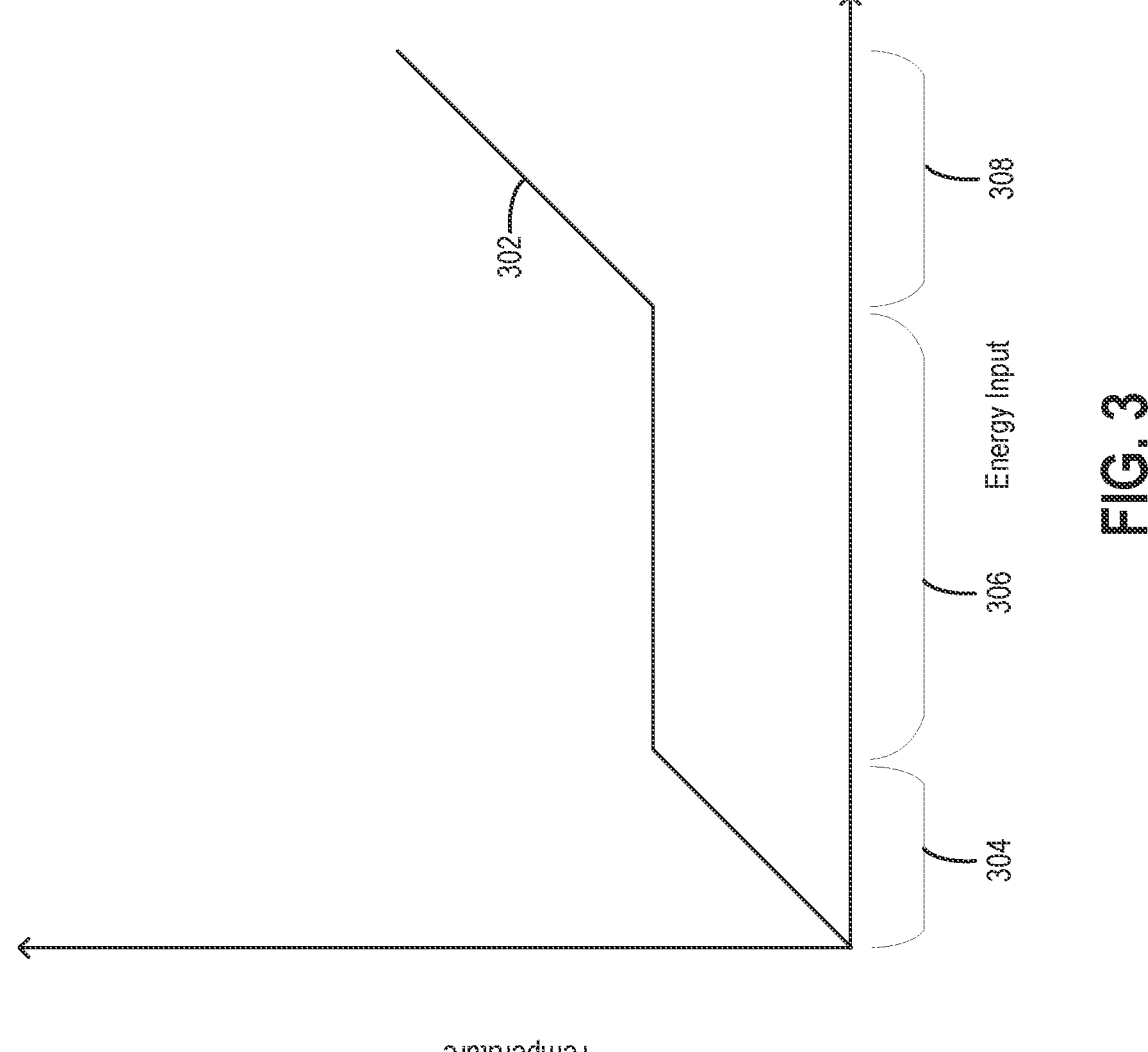
FIG. 3 shows a graph of temperature versus time for a phase change material which may be coupled to the contactor.
Figure 4:
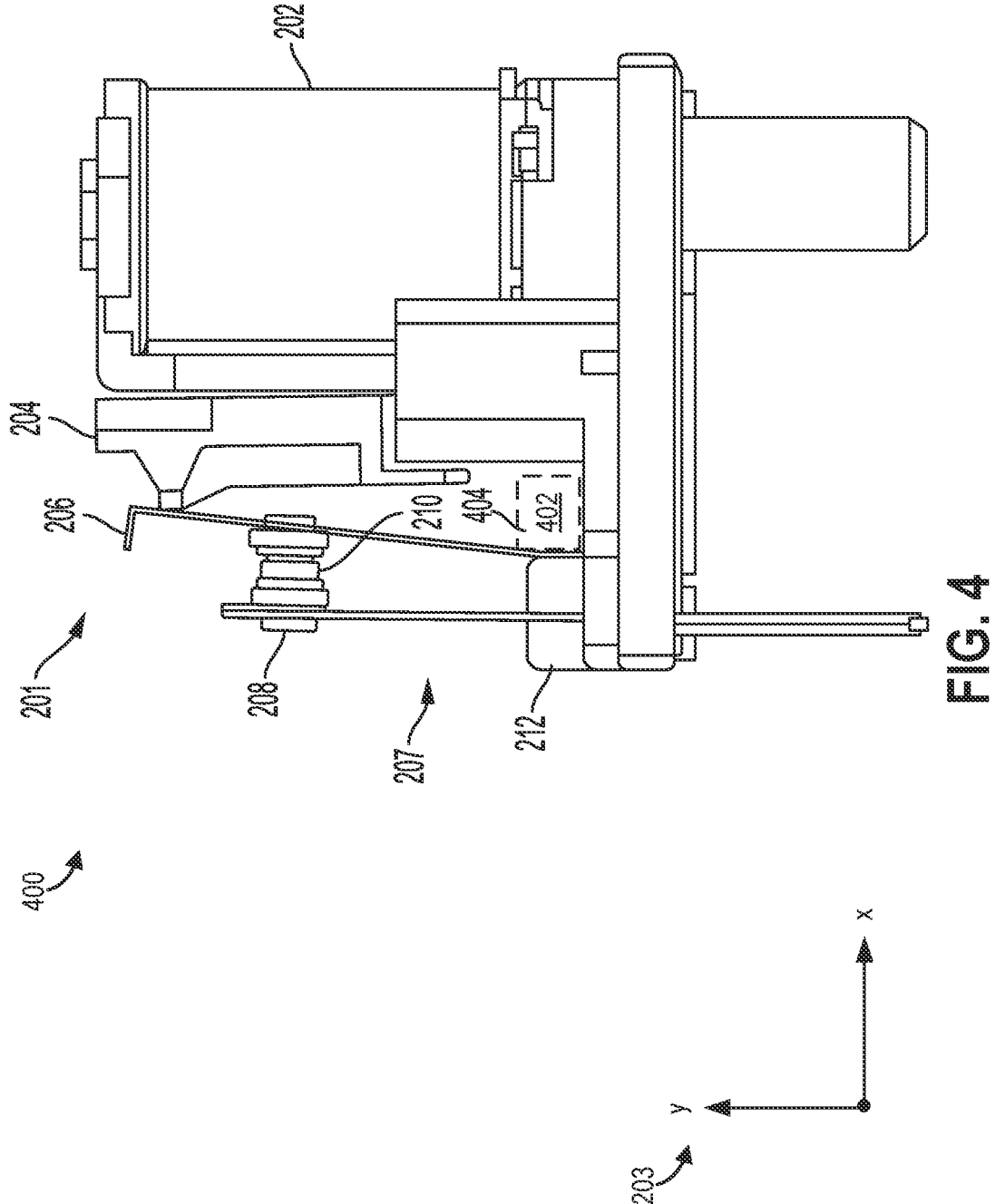
FIG. 4 shows the contactor of FIG. 2 adapted with a phase change material.
Figure 5:
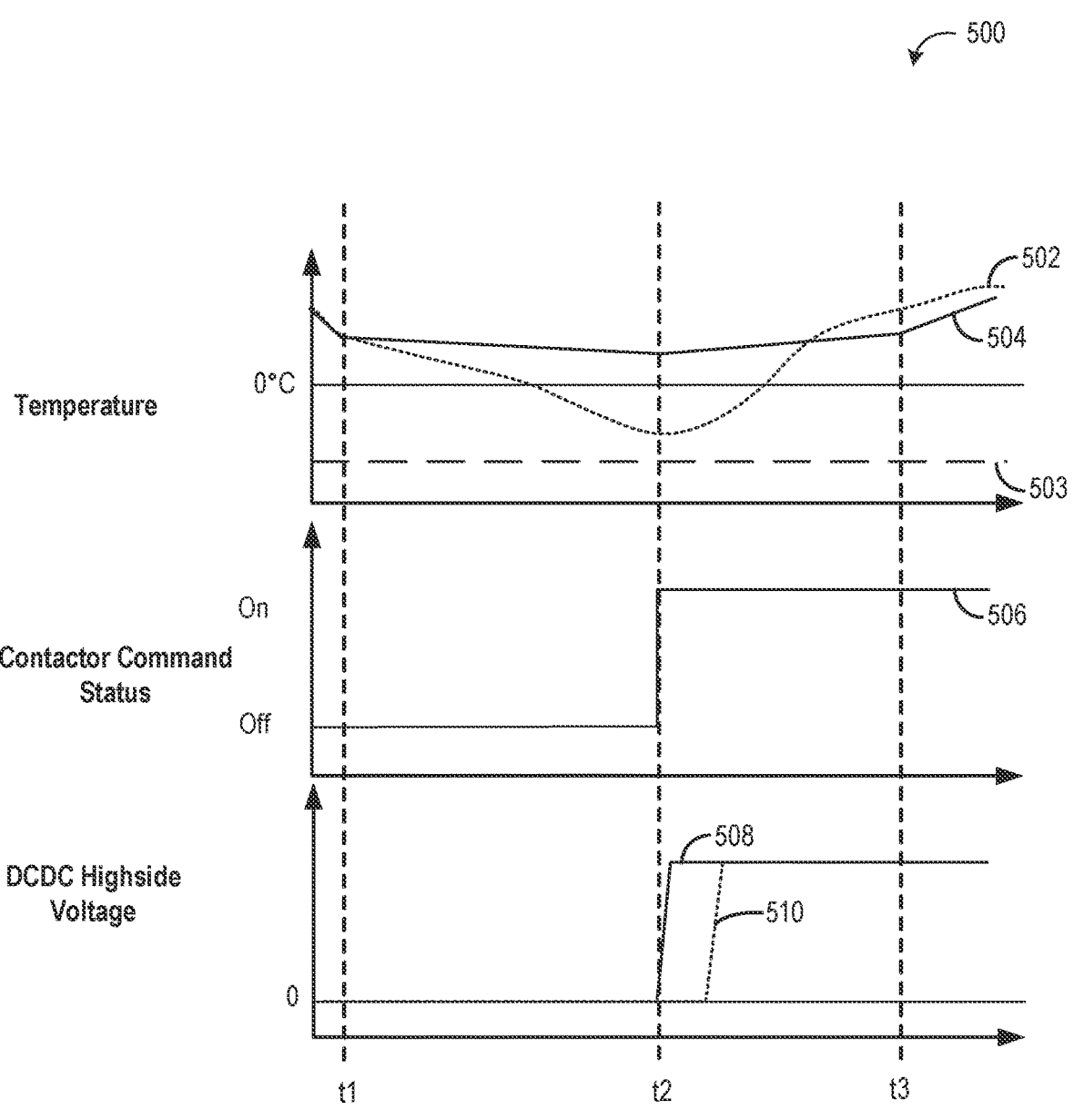
FIG. 5 shows variations in operating parameters for a battery electric circuit of a vehicle having a phase change material coupled to a contactor of the battery electrical circuit.

The following description relates to systems and methods for preventing ice crystal formation between contacts of a contactor of a vehicle. Herein, contacts may also be referred to as conductors. The vehicle may be a hybrid electric vehicle as shown in FIG. 1 and may include one or more contactors. The one or more contactors may relay flow of electricity throughout the vehicle. Ice crystal formation between contacts of the one or more contactors may therefore adversely affect vehicle operation. An example of a contactor of the prior art is shown in FIG. 2, which depicts a presence of ice crystals that inhibits operation of the contactor. In one example, a phase change material may be used to mitigate formation of ice crystals on the contactor. The phase change material may herein be defined as a material which absorbs and releases large amounts of latent heat when a physical state of the material is changed. As such, phase change materials may be able to store energy and release energy during phase transitions. An example of a temperature vs energy input graph for the phase change material is shown in FIG. 3 which shows a region, relative to temperature, where energy may be stored or released. At this region, the phase change material may store thermal energy during vehicle operation which may then be released when the vehicle is not operating to prevent ice crystal formation between contacts of the contactor. The contactor of FIG. 2 is shown in FIG. 4 with the phase change material coupled to the one of the contacts. An example timing diagram of a vehicle operating with and without the phase change material is shown in FIG. 5.

Turning now to FIG. 1, a schematic of a vehicle 10 is shown. In one example, vehicle 10 may be a plug in hybrid vehicle. In alternate examples, vehicle 10 may be an electric vehicle or a full hybrid vehicle. Vehicle 10 may include a battery pack 102. In one example, battery pack 102 may be a traction battery, providing power to wheels 111 of vehicle 10. Battery pack 102 may include a plurality of rechargeable batteries coupled in series and/or parallel. Battery pack 102 may be electrically coupled to a plurality of components of vehicle 10.

Battery pack 102 may be electrically coupled to inverter 104. Inverter 104 may convert a DC output of battery pack 102 into a three-phase alternating current demanded by an electric machine 110. Electric machine 110 may be a motor providing torque to wheels 111 by coupling to transmission 114. Additionally or alternatively, electric machine 110 may be a generator configured to recharge battery pack 102. In an example where electric machine 110 is acting as a generator, inverter 104 may convert the three-phase alternating current output by electric machine 110 into the DC current demanded by battery pack 102. In an example where vehicle 10 is a hybrid vehicle (plug in or full hybrid), vehicle 10 may include an engine 112. Engine 112 may be an internal combustion engine configured to combust fuel such as gasoline, diesel and/or natural gas among others. Engine 112 may also be configured to provide power to wheels 111 by coupling to transmission 114. However, when vehicle 10 is an electric vehicle, engine 112 may be omitted.

In an example where vehicle 10 is a plug in hybrid or an electric vehicle, battery pack 102 may be configured to couple to an external power supply 116. The power source may be configured to output DC current to recharge battery pack 102. Battery pack 102 may also be electrically coupled to high voltage loads 106 and low voltage loads 108. High voltage loads 106 may include accessories of vehicle 10 demanding high voltage, such as a compressor or electric heaters. Low voltage loads 108 may include accessories of vehicle 10 demanding low voltage such as an auxiliary 12V battery.

Vehicle 10 may also include one or more contactors 105. Contactors 105 may be configured to modulate flow of electricity from battery pack 102 to inverter 104, power supply 116, high voltage loads 106 and low voltage loads 108. Said another way, contactors 105 may comprise a battery circuit of vehicle 10. Although contactors 105 are depicted in an open position in FIG. 1, contactors 105 may be adjusted between the open position and a closed position. If the contacts of the contactor are in the open position when the contactor is de-energized, the contactor may be considered to be normally open. If contacts of the contactor are in the closed position when the contactor is de-energized, the contactor may be considered normally closed. Further, each contactor may be in a same or different position relative to other contactors. In other words, each contactor may operate independently of the other contactors. Current may be delivered from battery pack 102, to high voltage loads 106, low voltage loads 108, and inverter 104 via contactors 105 when contactors 105 are adjusted to the closed position. In the closed position, contacts of each contactor are in directly contact, thereby providing continuity through respective electric circuits. However, a presence of an obstruction, such as formation of ice crystal, between the contacts may impede current flow and hinder operation of electrical components of the electric circuits. For example, operation of the low voltage accessories, the high voltage accessories, and/or electric machine 110 may be inhibited. In some examples, the presence of ice at contactors 105 may disable vehicle start-up. Presence of ice at contactors may also inhibit charge and transferring electricity to another vehicle, among other issues related to electrical circuits of vehicle 10.

Vehicle 10 may be controlled at least partially by a control system 14 including controller 12. Controller 12 may receive various signals from sensors 16 coupled to engine 112, and send control signals to various actuators 81 coupled to the engine and/or vehicle. The various sensors may include, for example, various temperature, pressure, and battery state of charge sensors. The various actuators may include, for example, various valves, throttles, and contactors. Controller 12 may be a microcomputer, including a microprocessor unit, input/output ports, an electronic storage medium for executable programs and calibration values. Controller 12 may be programmed with computer readable data representing instructions executable to perform the methods described below as well as other variants that are anticipated but not specifically listed. In one example, controller 12 may command one or more contactors 105 to be energized, thereby causing contactors to switch from an open position to a closed position or vice versa. As one example, if a user requests electric motor start, controller 12 may command one more contactors configured between current between battery pack 102 and inverter 104 to switch from the open position to the closed positon, thereby allowing current flow between battery pack 102 and inverter 104.

Ice crystals may nucleate on contacts of a contactor (such as contactors 105 described above with respect to FIG. 1) if an amount of moisture is present at a surface of the contacts and an ambient temperatures drop below a freezing point of water. If ice crystals nucleate between the contacts or within a vicinity of the contacts, there may be an undesirable delay between a command sent by a controller of a vehicle (such as controller 12 of FIG. 1) and the contactor opening or closing as commanded. To prevent ice crystal formation between or in the vicinity of the contacts, a phase change material may be coupled to a portion of at least one contact of the contactor. During vehicle operation, the contacts of the contactor may warm due to resistive heating of the contacts when the contacts are in a closed position. At least a portion of the heat generated by the resistive heating may be stored by the phase change material and released back to the contacts when the vehicle is off and/or current is no longer flowing through the contactor. In this way, ice formation on the contacts may be inhibited for a duration of time. The phase change material may release the heat passively, without demanding additional power or actuation from the controller of the vehicle. Further, the phase change material may be retrofit to already existing contactors. As such the phase change material may be readily implemented across different vehicle configurations to reduce ice crystal formation at vehicle contactors without demanding changes to the vehicle components.

Turning now to FIG. 2, an example 200 of a contactor 201 of the prior art with ice crystals 210 present between a set of contacts 207 is shown. Set of contacts 207 includes first contact 208 and a second contact 206. Also shown in FIG. 2 is a coordinate system 203 including an x-axis, y-axis, and z-axis. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

First contact 208 (e.g., first conductor) and second contact 206 (e.g., second conductor) may each be cantilevered and coupled at one end to a base 212 of contactor 201. Contactor 201 is depicted from a perspective along the z-axis with set of contacts 207 is an open position, and may be similar to the contactors 105 of FIG. 1. Contactor 201 may be configured to be normally open, e.g., in the open position when not energized, however, normally closed contactors have also been considered within the scope of this disclosure. Further, contactor 201 includes a single set of contacts 207, but contactors with more than one set of contacts have also been considered within the scope of this disclosure. The more than one set of contacts may be all normally open, all normally closed, or a combination of the two.

Contactor 201 includes coil 202. Coil 202 may be an electromagnetic coil configured to generate a magnetic field when the contactor is energized (e.g., actuated by a controller such as controller 12 of FIG. 1 by delivering a current to coil 202 via a low voltage circuit). Coil 202 may be positioned in contactor 201 so that the magnetic field may interact with set of contacts 207, causing the contacts to close. Contactor 201 may be configured with coil 202 to one side of set of contacts 207 along the x-axis. Contactors with other coil and contact configurations have been considered within the scope of this disclosure.

Contactor 201 may also include an insulation plate 204 configured between set of contacts 207 and coil 202. Insulation plate 204 may be formed of a plastic material such as nylon and may also form an enclosure of contactor 201 (not shown in FIG. 2 for clarity). The plastic material may be hygroscopic and absorb moisture during normal operation of a vehicle under a first high humidity condition. When conditions change to a second low humidity condition, the absorbed moisture may be driven out of the plastic material. Some of the moisture released by the plastic material may end up between or in a vicinity of the set of contacts 207 and may form ice crystals 210 if ambient conditions are below 0° C.

Ice crystals 210 are shown forming between first contact 208 and second contact 206 which may block direct contact between faces (e.g., face sharing contact) of first contact 208 and second contact 206 when contactor 201 is energized. Alternatively, when contactor 201 is a normally closed contactor, ice crystals 210 may form while the contactor is energized and set of contacts 207 are in an open position, thus preventing current flow when the contactor is de-energized. In this way, ice crystals may cause an undesirable delay between actuation of coil 202 and the corresponding modulation of the electric current through contactor 201.

As described above, a phase change material may store heat generated by a contactor such as contactor 201 of FIG. 2 and release the stored heat over a duration of time when the contactor is no longer generating heat and a temperature of the contactor cools. Graph 300 of FIG. 3 shows temperature as a function of energy input. Trace 302 corresponds to a temperature of a phase change material. Temperature increases along a left axis of graph 300. The phase change material may be exposed to a heat source and undergo a phase change as energy input (e.g., energy absorbed by the phase change material) increases along a bottom axis of graph 300.

During absorption of a first amount of energy, indicated by bracket 304, the phase change material may be in a first stage. For example, the phase change material may be a solid during absorption of the first amount of energy. A first slope of trace 302 during the first stage may be determined by a specific heat and mass of the solid phase of the phase change material. During a second stage of energy, indicated by bracket 306, the phase change material may undergo a phase transition to a second phase. For example, the phase change material may change from a solid to a liquid. While the phase change material is undergoing the phase transition, input energy is directed to disrupting intermolecular forces and thus the temperature of the phase change material does not rise during the phase transition. In other words, trace 302 plateaus during the phase transition. An amount of energy required (e.g., length of second energy input along a bottom axis of graph 300) to change a phase of a material may be referred to as the material's latent heat. Latent heat may be characteristic of the material, the type of phase transition (e.g., solid to liquid), and an amount of the material.

By an end of the phase transition, the phase change material may be entirely or nearly entirely in the second phase. During a third stage of energy input, indicated by bracket 308, the phase transition is complete and the temperature of the phase change material increases again. A second slope of trace 302 during the third stage may correspond to a specific heat and mass of the phase change material after the phase transition.

A phase change material may be a material used to store and release energy as latent heat during a phase change, thus the higher the specific latent heat, the greater the energy storage capacity of the phase change material. For this reason, phase change materials may be selected to have a high specific latent heat (e.g., a long flat second stage of trace 302 as described above with respect to FIG. 3). Further, the phase change materials may be selected for use based on a temperature at which the phase change occurs. A suitable phase change material for preventing ice crystal formation on contacts of a contactor may have a high latent heat for a phase change occurring at a temperature between 0° C. and a maximum operating temperature of the contactor.

In one embodiment, the phase change material may be selected to undergo a phase change at substantially the same temperature as a maximum operating temperature of the contactor. Herein, substantially the same values may be within 5% of each other. For example, the phase change material may have a phase change occurring at about 260° C. Specific latent heat may have units of kJ/kg, and therefore the amount of latent heat stored by the phase change material also depends on how much of the phase change material is present.

A vehicle, such as vehicle 10 of FIG. 1, may actuate a contactor of the vehicle from open to closed. Electrical current may flow through the contactor, thus warming the contacts via resistive heating. A phase change material coupled to the contacts may absorb heat from the contacts and warm until the phase change temperature is reached (e.g., stage 1 of FIG. 3). The phase change material may continue to absorb heat from the contacts and undergo a phase change (e.g., stage 2 of FIG. 3). If the phase change material absorbs enough heat to completely change phase, the phase change material may continue to increase in temperature (e.g., stage 3 of FIG. 3) while electrical current flows through the contactor. The phase change temperature may be close to an operating temperature of the contactor so that an amount of thermal energy going to warm the phase change material after the phase change is minimized.

When the vehicle is shut down, the contactor may be actuated to an open position. In the open position, current may not flow through the contacts and the contacts may cool. During this time, the contactor may also cool and draw heat from the contacts and water may condense in the air gap between the open contacts. As the temperature of the contacts decreases, the temperature of the phase change may also decrease until the phase change material reaches the phase change temperature. During the phase change, the phase change material may slowly release the stored latent heat at a rate determined by the temperature difference between the phase change material and the contact and their thermal conductivities, thus maintaining the temperature of the contact at the phase change temperature. In this way, the contacts are maintained at a temperature above 0° C. and the moisture which collects between the contacts may be prevented from freezing.

Turning now to FIG. 4, a second example 400 of the contactor 201 of FIG. 2 is depicted with a phase change material 402 coupled thereto. Components of contactor 201 are labeled similarly and will not be reintroduced. In one embodiment, as shown in FIG. 4, phase change material 402 may be in direct thermal contact with at least one of set of contacts 207 and remain fixedly coupled with the respective contact(s) during a phase change of phase change material

402. For example, the phase change may be a transition between a first solid phase and a second solid phase (e.g., between two different crystalline phases), thus remaining solid over an operating temperature range of contactor 201. Specifically, phase change material 402 may be pentaerythritol or neopentyl glycol. Phase change material 402 may be coupled via a thermally conductive adhesive or solder.

In another example, the phase change of phase change material 402 may be between a solid phase and a liquid phase and/or between a liquid phase and a gas phase, thus phase change material 402 may optionally be contained within an enclosure 404 to store phase change material 402 when phase change material 402 is in a liquid and/or gaseous state. Enclosure 404 may optionally include an overpressure valve to release gas from enclosure 404 if phase change material 402 is in a gas phase and pressure rises above a threshold value. A wall of enclosure 404 may be formed of a portion of a side of contact 206 and/or contact 208. In this way, phase change material 402 may be directly coupled (e.g., in direct thermal contact) to contact 206 and/or contact 208 while phase change material 402 is in a liquid phase or a gas phase. Enclosure 404 is shown in FIG. 4 as a rectangle, but other shapes of enclosure 404 have been considered.

As another example, phase change material 402 may be embedded in an inert material such as a mat of glass fibers. The inert material may support phase change material 402 in a solid or liquid phase while being coupled to and maintaining direct physical contact between phase change material 402 and set of contacts 207.

Phase change material 402 may be coupled to at least one of set of contacts 207 in a way that does not interfere with actuation of set of contacts 207. Therefore, phase change material 402 is not positioned between contact 208 and contact 206. Said another way, phase change material 402 is not positioned on a face of one of set of contacts 207 which faces another of set of contacts 207. As one example, phase change material 402 may be located at a base of second contact 206 (e.g., at an end closest to base 212) on a side of second contact 206 parallel to the y-z plane and distal to first contact 208. The second side of contact 206 may be referred to as the outer surface. Phase change material 402 may extend vertically (along the y-axis) along a portion of a height of second contact 206. For example, the phase change material may extend along at least 10% of the height of second contact 206. In another example, phase change material 402 may be instead or additionally positioned at a base of contact 208 and may similarly extend along a portion of a height of contact 208.

Contactor 201 may include additional sets of contacts not shown in FIG. 2 or FIG. 4. In an example where contactor 201 includes more than one set of contacts, phase change material 402 may be coupled to each set of contacts. In another example, multiple phase change materials (e.g., different types of phase change materials) may be used and each phase change material may be matched to a set of contacts based on a phase transition temperature of the phase change material and an expected heating of the set of contacts.

Phase change material 402 may undergo a phase change above 30° C. and the phase change may be associated with a high latent heat, for example, and the phase change material may be thermally stable up to the maximum temperatures experienced by set of contacts 207 (e.g., does not degrade at temperatures up to 260° C.). Phase change material 402 may also be low cost, have low-toxicity, and be environmentally friendly. Further, phase change material 402 may be selected to be chemically compatible with a material forming set of contacts 207. For example, the phase change material may be paraffin wax, glass fiber, pentaerythritol phosphate, pentaerythritol, and/or neopentyl glycol among others. In some examples, the phase change material may be a mix of materials with different specific latent heats. An amount of latent heat stored by phase change material 402 may also depend on an amount of phase change material. The amount of phase change material coupled to at least one of set of contacts 207 may therefore be determined based on having sufficient mass to prevent ice crystal nucleation via heat release while maintaining unimpeded adjustment of the contacts between open and closed positions.

Turning now to FIG. 5, an example timing diagram 500 shows variations in battery electric circuit parameters during operation of a vehicle. The battery electric circuit may include at least one contactor, such as contactor 201 of FIG. 2, and the contactor may be controlled by a controller of the vehicle (such as controller 12 of FIG. 1) As described above with respect to FIG. 4, the contactor may include a phase change material coupled to at least one contact of the contactor. The phase change material may absorb ambient heat and/or heat generated by the resistive heating of the contact, causing a phase change in the phase change material. When current is not flowing through the contact and ambient temperature decreases, the phase change material may release the latent heat stored during the phase change, thus maintaining a temperature of the at least one contact above ambient temperature.

A horizontal axis of diagram 500 denotes time and vertical markers t1, t2, and t3 denote a times of events. Timing diagram 500 includes three plots. A vertical axis may show variation between two variables in some plots and may show increasing values in other plots as denoted by labels of the vertical axis of each plot. A first plot, line 502 shows a temperature of a contact of a first contactor which is not coupled to a phase change material and line 504 shows a temperature of a contact of a second contactor which is coupled to a phase change material. Line 503, also on the first plot, shows an ambient temperature around the vehicle, which is below 0° C. A second plot, line 506 shows a contactor command status. The contactor command status may be on or off, where an electromagnetic coil of the contactor may be energized when the contactor status is on and de-energized when the contactor status is off. A third plot, line 510 shows a DCDC high side voltage provided to an electrical accessory, such as an electric motor, from the battery when the voltage is modulated by the first contactor (e.g., no phase change material) and line 508 shows a DCDC high side voltage when the voltage is modulated by the second contactor (e.g., having the phase change material).

Prior to t1, the vehicle may be in a state where the contactor status is off. For example, the vehicle may be off and/or a battery of the vehicle is not charging. Without current running through the contactor, both lines 502 and 503 show a decrease in temperature of the contacts. At t1 the contacts reach a temperature corresponding to a phase change of the phase change material. After t1 and before t2, without a phase change material coupled to the first contactor, as shown by line 502, a temperature of the contact of the first contactor may approach the ambient temperature shown by line 503 and drop below 0° C. Ice may form at the first contactor. With the phase change material coupled to the second contactor as shown by line 504, the temperature of the contact of the second contactor is maintained at substantially the temperature of the phase change material and remains at that temperature as the contact is warmed by release of latent heat stored in the phase change material. The temperature of the contact of the second contactor is maintained above 0° C. Prior to both t1 and t2 the contactors may be commanded off (e.g., in an open position) and the DCDC high side voltage of both the first contactor and the second contactor may be zero as shown by lines 508 and 510.

At time t2, the status of the contactor may change from off to on. For example, a user of the vehicle may turn the vehicle on which prompts starting the electric motor of the vehicle or the battery of the vehicle may demand recharging. Without a phase change material coupled to the contact of the first contactor an actuation of the contactor, provision of the DCDC high side voltage to the electric motor may be delayed for a duration of time after t1 as shown by line 510. The delay may be caused by ice crystals nucleated between/on contacts resulting from the temperature of the contact falling below 0° C. In contrast, with a phase change material coupled to the contact of the second contactor, the DCDC high side voltage may be transmitted to the electric motor with a minimal delay after t1, as shown by line 508. Because the temperature of the contact of the second contactor did not decrease below the phase change temperature, even with an ambient temperature below 0° C., ice crystal nucleation is inhibited, allowing the contactor to operate as expected.

Changing the status of the contactor from off to on at t2 also allows current to flow through the contacts resulting in resistance heating of the contacts. The contacts of the first contactor, as shown by line 504 may begin to heat quickly after t2. The contacts of the second contactor may also begin to heat after t2 but at a slower rate than the first contactor. Between t2 and t3, the phase change material may absorb heat from the second contactor to undergo the phase change, thus maintaining a temperature of the second contactor. After t3, all of the phase change material may be in a different phase and both the first contactor and second contactor increase in temperature as heat is generated by current flowing through the contactor.

In this way, delayed operation of a contactor due to ice formation between and/or around contacts of the contactor may be avoided. Coupling a phase change material to at least one contact of the contactor may offer a passive solution which does not demand modifications to a controller of the contactor or associated systems. Further, the phase change material may be retrofit to already existing contactors of an electrical circuit as well as being incorporated during manufacturing of new contacts, thus providing a solution applicable across a variety of contactors and vehicles.

FIGS. 2 and 4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As one embodiment the disclosure also provides support for a contactor, comprising: a set of conductors, and a phase change material coupled to at least a first conductor of the set of conductors, wherein the phase change material is not positioned between the set of conductors. In a first example of the system, the set of conductors includes a second conductor configured to be in face sharing contact with the first conductor when the set of conductors are adjusted to a closed position, and wherein an outer surface of the first conductor is a face of the first conductor facing away from the second conductor. In a second example of the system, optionally including the first example, the phase change material is positioned along an outer surface of the first conductor and/or along an outer surface of a second conductor of the set of conductors, and wherein the phase change material is not positioned between the first conductor and the second conductor. In a third example of the system, optionally including one or both of the first and second examples, the phase change material undergoes a phase change above 30° C. In a fourth example of the system, optionally including one or more or each of the first through third examples, the phase change material is one or more of paraffin, glass fiber, pentaerythritol phosphate, pentaerythritol, or neopentyl glycol. In a fifth example of the system, optionally including one or more or each of the first through fourth examples, in the phase change material undergoes a phase change between a first solid phase to a second solid phase. In a sixth example of the system, optionally including one or more or each of the first through fifth examples, the phase change material undergoes a phase change between a solid phase and a liquid phase.

The disclosure also provides support for a battery circuit, comprising: a contactor including a set of conductors, and a phase change material in thermal contact with the set of conductors of the contactor, and wherein the set of conductors include a first conductor and a second conductor configured to be in face sharing contact when the contactor is activated to a closed position and wherein the phase change material is positioned on a face of the first conductor facing away from the second conductor and/or the phase change material is positioned on a face of the second conductor facing away from the first conductor. In a first example of the system, the phase change material is contained by an enclosure. In a second example of the system, optionally including the first example, a wall of the enclosure is a surface of the first conductor facing away from the second conductor and/or a surface of the second conductor facing away from the first conductor. In a third example of the system, optionally including one or both of the first and second examples, the phase change material contacts at least 10% of the surface of the first conductor and/or at least 10% of the surface of the second conductor. In a fourth example of the system, optionally including one or more or each of the first through third examples, the phase change material remains in thermal contact with the set of conductors of the contactor during a phase change of the phase change material. In a fifth example of the system, optionally including one or more or each of the first through fourth examples, a phase change temperature of the phase change material is incorporated into an inert material. In a sixth example of the system, optionally including one or more or each of the first through fifth examples, the phase change material absorbs thermal energy from resistive heating of the set of conductors of the contactor.

The disclosure also provides support for a vehicle, comprising: a battery pack, one or more contactors configured to modulate current flow to and from the battery pack, and a phase change material coupled to at least one contact of the one or more contactors, the one or more contactors including at least a first conductor facing a second conductor, and wherein the phase change material is within an enclosure, wherein a side of the first conductor or second conductor forms a wall of the enclosure. In a first example of the system, the phase change material absorbs heat when current flows through the one or more contactors. In a second example of the system, optionally including the first example, the phase change material releases heat when current does not flow through the one or more contactors. In a third example of the system, optionally including one or both of the first and second examples, the phase change material is chemically compatible with a material forming the one or more contactors. In a fourth example of the system, optionally including one or more or each of the first through third examples, the phase change material is thermally stable up to a maximum operating temperature of the one or more contactors. In a fifth example of the system, optionally including one or more or each of the first through fourth examples, a phase change of the phase change material may be between a first solid phase and a second solid phase, between a liquid and a solid, and/or between a gas and liquid.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A contactor, comprising:
a set of conductors; and
a phase change material coupled to at least a first conductor of the set of conductors, wherein the phase change material is not positioned between the set of conductors, wherein the phase change material is positioned along an outer surface of the first conductor and/or along an outer surface of a second conductor of the set of conductors, and wherein the phase change material is not positioned between the first conductor and the second conductor, wherein the phase change material is contained by an enclosure, wherein a wall of the enclosure is a surface of the first conductor facing away from the second conductor and/or a surface of the second conductor facing away from the first conductor.

2. The contactor of claim 1, wherein the set of conductors includes a second conductor configured to be in face sharing contact with the first conductor when the set of conductors are adjusted to a closed position, and wherein an outer surface of the first conductor is a face of the first conductor facing away from the second conductor.

3. The contactor of claim 1, wherein the phase change material undergoes a phase change above 30° C.

4. The contactor of claim 1, wherein the phase change material is one or more of paraffin, glass fiber, pentaerythritol phosphate, pentaerythritol, or neopentyl glycol.

5. The contactor of claim 1, where in the phase change material undergoes a phase change between a first solid phase to a second solid phase.

6. The contactor of claim 1, wherein the phase change material undergoes a phase change between a solid phase and a liquid phase.

7. A battery circuit, comprising:
a contactor including a set of conductors; and
a phase change material in thermal contact with the set of conductors of the contactor, and wherein the set of conductors include a first conductor and a second conductor configured to be in face sharing contact when the contactor is activated to a closed position and wherein the phase change material is positioned on a face of the first conductor facing away from the second conductor and/or the phase change material is positioned on a face of the second conductor facing away from the first conductor and wherein the phase change material is contained by an enclosure, wherein a wall of the enclosure is a surface of the first conductor facing away from the second conductor and/or a surface of the second conductor facing away from the first conductor.

8. The battery circuit of claim 7, wherein the phase change material contacts at least 10% of the surface of the first conductor and/or at least 10% of the surface of the second conductor.

9. The battery circuit of claim 7, wherein the phase change material remains in thermal contact with the set of conductors of the contactor during a phase change of the phase change material.

10. The battery circuit of claim 7, wherein the phase change material is incorporated into an inert material.

11. The battery circuit of claim 7, wherein the phase change material absorbs thermal energy from resistive heating of the set of conductors of the contactor.

12. A vehicle, comprising:
a battery pack;

one or more contactors configured to modulate current flow to and from the battery pack; and a phase change material coupled to at least one contact of the one or more contactors, the one or more contactors including at least a first conductor facing a second conductor, and wherein the phase change material is within an enclosure, wherein a side of the first conductor facing away from the second conductor or a side of the second conductor facing away from the first conductor forms a wall of the enclosure.

13. The vehicle of claim 12, wherein the phase change material absorbs heat when current flows through the one or more contactors.

14. The vehicle of claim 13, wherein the phase change material releases heat when current does not flow through the one or more contactors.

15. The vehicle of claim 12, wherein the phase change material is chemically compatible with a material forming the one or more contactors.

16. The vehicle of claim 12, wherein the phase change material is thermally stable up to a maximum operating temperature of the one or more contactors.

17. The vehicle of claim 12, wherein a phase change of the phase change material may be between a first solid phase and a second solid phase, between a liquid and a solid, and/or between a gas and liquid.

* * * * *